(12) United States Patent
Sambhy et al.

(10) Patent No.: US 8,841,401 B1
(45) Date of Patent: Sep. 23, 2014

(54) THERMALLY STABLE OLEOPHOBIC ANTI-WETTING COATING FOR INKJET PRINTHEAD FACE

(71) Applicant: Xerox Corporation, Norwalk, CT (US)

(72) Inventors: Varun Sambhy, Penfield, NY (US); Santokh S Badesha, Pittsford, NY (US); Mandakini Kanungo, Penfield, NY (US); Peter M Gulvin, Webster, NY (US); David J Gervasi, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/786,235

(22) Filed: Mar. 5, 2013

(51) Int. Cl.
 *C08G 77/24* (2006.01)
 *C09D 183/08* (2006.01)

(52) U.S. Cl.
 CPC .................. *C09D 183/08* (2013.01)
 USPC ........................................................ 528/42

(58) Field of Classification Search
 CPC ......... C08L 83/08; C08L 83/04; C08L 83/00; B41J 2/1606; C08G 77/12; C08G 77/20
 USPC ................................................ 528/31, 32, 42
 See application file for complete search history.

(56) References Cited

U.S. PATENT DOCUMENTS

| 3,928,629 | A | * | 12/1975 | Chandra et al. | ............... | 427/387 |
| 6,761,991 | B2 | * | 7/2004 | Frisch et al. | .................. | 429/469 |
| 8,156,230 | B2 | | 4/2012 | Bakke | | |
| 2012/0044298 | A1 | | 2/2012 | Sambhy | | |

FOREIGN PATENT DOCUMENTS

| JP | 5-098183 A1 | 4/1993 |
| JP | 5-202309 A1 | 8/1993 |
| JP | 6-200176 A1 | 7/1994 |

* cited by examiner

*Primary Examiner* — Kuo-Liang Peng
(74) *Attorney, Agent, or Firm* — Pillsbury Winthrop Shaw Pittman LLP

(57) ABSTRACT

A coating for an ink jet printhead front face, wherein the coating comprises an oleophobic anti-wetting coating having high thermal stability and maintaining good contact and sliding angle performance. In particular, the coating comprises fluorinated silicone.

14 Claims, 3 Drawing Sheets

THERMALLY STABLE OLEOPHOBIC ANTI-WETTING COATING FOR INKJET PRINTHEAD FACE

BACKGROUND

Inkjet printers produce images by jetting or ejecting droplets of liquid ink from an inkjet printhead onto a recording substrate (e.g., paper). The printhead typically has a front face with a nozzle opening defined therein, through which liquid ink is ejected as droplets onto the recording substrate.

The front face of an inkjet printhead can become contaminated by wetting or drooling of ink. Such contamination can cause or contribute to partial or complete blocking of the nozzle opening within the front fact of the inkjet printhead, cause under- or over-sized ink droplets to be ejected from the inkjet printhead, alter the intended trajectory of ejected ink droplets onto the recording substrate, and the like, all of which degrade the print quality of inkjet printers.

The front fact of an inkjet printhead is typically coated with a material such as polytetrafluoroethylene (PTFE) (e.g., Teflon®) or perfluoroalkoxy (PFA), to protect it. Current printheads have good initial performance with solid ink, including those commercially available from Xerox Corporation. However, over the operational lifetime, the performance degrades and ink does not readily slide over the printhead front face coatings at typical ink-ejecting temperatures. Rather, the ink tends to adhere and flow along the printhead front face coating, leaving a residual ink film which can partially or completely block the nozzle opening within the front face of the inkjet printhead. FIG. 1 is a photograph of the front face of an inkjet printhead after a printing run showing wetting and contamination of a solid ink over most of the area of the front face surrounding nozzle openings. Thus, oleophobic anti-wetting coatings which prevent drooling failure are important to improve robustness and reliability, provide for new market penetration for future solid inks.

Solid inks are those characterized by being solid at room temperature and molten at an elevated temperature at which the molten ink is applied to a substrate. Solid inks generally comprise an ink vehicle, one or more waxes, an optional colorant, and one or more optional additives such as viscosity modifiers, antioxidant, plasticizer, and the like. UV curable inks generally comprise a photoinitiator package, a curable carrier material, an optional colorant, and one or more optional additives such as viscosity modifiers, dispersant, synergist, and the like. UV curable phase change inks, a subset of UV curable inks, may also include a gellant and optionally a curable wax. The term "curable" refers, for example, to the component or combination being polymerizable, that is, a material that may be cured via polymerization, including, for example, free radical routes, and/or in which polymerization is photoinitiated though use of a radiation sensitive photoinitiator. For example, the curable carrier material may be one or more curable monomers or a curable wax.

Contamination of an inkjet printhead front face can be minimized somewhat by adopting purging and/or wiping procedures. However, these procedures can undesirably consume time and/or use excessive amounts of ink, thereby decreasing the useful life of the inkjet printhead. Contamination of an inkjet printhead front face can also be minimized somewhat by providing an oleophobic anti-wetting printhead front face coating that does not wet significantly with ink ejected from nozzle openings of the printhead. When heated to temperatures typically encountered during printhead fabrication processes, however, the surface property characteristics of known oleophobic anti-wetting printhead front face coatings degrade to the point that they cannot be relied upon to minimize contamination of the inkjet printhead front face. Hence a thermally stable oleophobic anti-wetting coating that does not degrade in surface properties upon exposure to high fabrication temperatures is needed for printheads.

Other oleophobic printhead front face coatings found to be thermally stable comprise siloxyfluorocarbon (SFC) and are disclosed in U.S. patent application Ser. No. 13/069,304 filed Mar. 22, 2011, U.S. patent application Ser. No. 13/275,255 filed Oct. 17, 2011 and U.S. Patent Publication No. 2012/0044298, which are hereby incorporated by reference in their entirety. These coatings show good surface properties, such as high contact angle/low slide angle, with inks in stacking and ink aging tests even after exposure to high fabrication temperatures. However, these coatings may be expensive to manufacture and implement in printheads. Also the thermal stability of these coatings (as shown by onset of decomposition temperature in Thermal Gravimetric Analysis (TGA) scans) only slightly above printhead fabrication temperatures of 290° C., and may lead to less reliability and robustness of printhead fabrication steps.

As such, there is desired an alternative to the conventional print head face plate coatings that are used that would avoid the problems described above. The advantages of such a coating would be fewer printhead related defects, longer front face life, and reduced manufacturing costs for producing the coating. In particular, a robust and reliable anti-wetting coating for piezo print heads is especially important for image quality performance with organic-based inks.

SUMMARY

According to the embodiments illustrated herein, there is provided a novel composition for use in printhead assemblies.

In particular, the present embodiments provide a coating for an ink jet printhead front face, wherein the coating comprises a crosslinked dimethyl methyltrifluoropropyl siloxane polymer, wherein the coating has high thermal stability as indicated by less than about 15 percent weight loss when heated to up to a temperature of 290° C. at a pressure of up to 350 psi.

In further embodiments, there is provided a coating for an ink jet printhead front face, wherein the coating comprises a crosslinked dimethyl methyltrifluoropropyl siloxane polymer comprises repeating units having Formula I

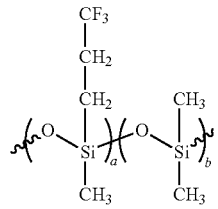

Formula I wherein a is an integer between 10 and 1000; and b is an integer between 1 and 500, wherein a drop of UV gel ink or a drop of solid ink exhibits a contact angle of greater than about 40° with the surface of the coating after the coating has been exposed to a temperature of up to 290° C. for at least 30 minutes.

In yet other embodiments, there is provided a process of forming an oleophobic anti-wetting coating for an ink jet printhead front face, comprising coating a reactant mixture comprising a polymer containing vinyl groups and a crosslinking agent containing Si—H groups onto a substrate; subjecting the coated reactant mixture to a curing treatment at a first temperature.

BRIEF DESCRIPTION OF THE DRAWINGS

For a better understanding of the present embodiments, reference may be had to the accompanying figures.

DETAILED DESCRIPTION

Figure 1:
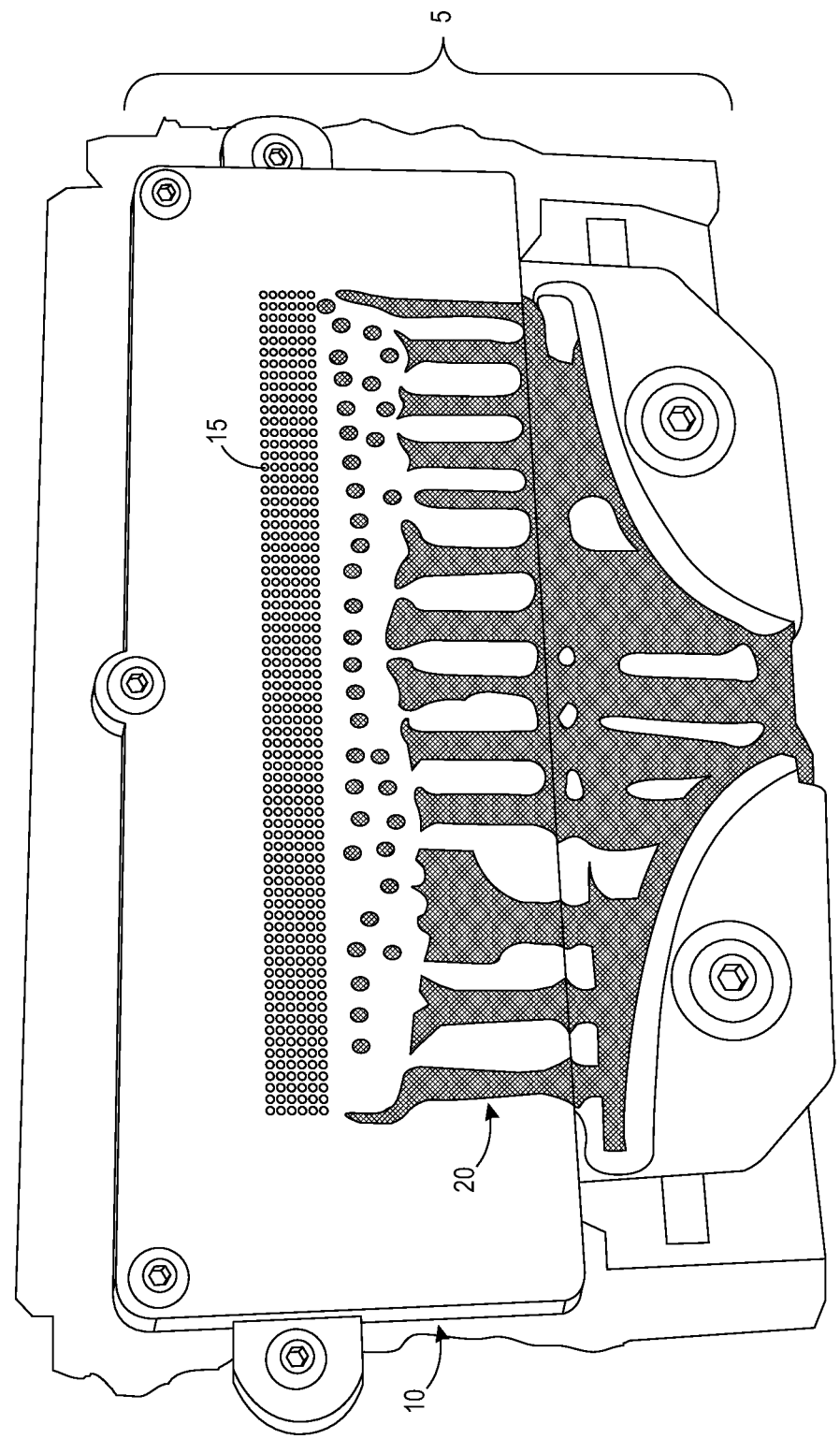
FIG. 1 is a photograph showing contamination of a solid ink over a nozzle area of a printhead having a PTFE coating after a printing run.

In the following description, it is understood that other embodiments may be utilized and structural and operational changes may be made without departure from the scope of the present embodiments disclosed herein.

The present embodiments provide a novel composition for use as a print head face plate coating to avoid many issues faced with conventional face plates, such as drooling or flooding. In addition, the novel composition provides a thermally stable oleophobic anti-wetting coating for the printhead frontface, and methods for making the same. In embodiments, the coating composition comprises a cross-linked fluorinated Room Temperature Vulcanizing (RTV) silicone. The fluorosilicone coatings demonstrated desirable properties for print head performance. For example, the TGA profile of these fluorosilicone coatings in air shows that the coating composition has exceptional thermal stability (30-300° C. weight loss of only 1%, and onset of decomposition 316° C.). These coatings retain good surface properties (both high contact angle and low sliding angle) after stacking (290° C./350 psi) and soaking in a mixture of Cyan Magenta Yellow Black (CMYK) inks for two days at 140° C. conditions as well. Notably, these fluorosilicone coatings showed very little thickness and mass decrease after exposure to 290° C. Any anti-wetting coating will be exposed to 290° C. during printhead fabrication steps and needs to be able to withstand these conditions. Moreover, such coatings can be especially attractive candidates as anti-wetting coatings for piezo print heads.

The adhesion of an ink drop towards a surface can be determined by measuring the sliding angle of the ink drop (i.e., the angle at which a surface is inclined relative to a horizontal position when the ink drop begins to slide over the surface without leaving residue or stain behind). The lower the sliding angle, the lower the adhesion between the ink drop and the surface. As used herein, the term "low adhesion" means a low sliding angle of less than about 30° when measured with ultra-violet curable gel ink or solid ink, with the printhead front face surface.

Embodiments described here include oleophobic anti-wetting coatings usable for an inkjet printhead front face, wherein the surface coatings comprise an oleophobic low adhesion polymeric material. When an inkjet printhead front face surface has such a coating, jetted drops of ultra-violet (UV) gel ink, referred to also as "UV ink," or jetted drops of solid ink exhibit low adhesion towards the surface coating.

The adhesion of an ink drop towards a surface can be determined by measuring the sliding angle of the ink drop, where the sliding angle is the angle at which a surface is inclined relative to a horizontal position when the ink drop begins to slide over the surface without leaving residue or stain behind. The lower the sliding angle, the lower the adhesion between the ink drop and the surface.

In some embodiments, a low sliding angle has a value of less than about 25°, in other embodiments the low sliding angle has a value of less than about 20°, when measured with ultra-violet curable gel ink or solid ink with the printhead front face surface as the surface. In yet other embodiments, a low sliding angle is greater than about 1° when measured with ultra-violet curable gel ink or solid ink, with the printhead front face surface as the surface.

As used here, an oleophobic anti-wetting coating is "thermally stable" when drops of ultra-violet gel ink or solid ink exhibit low adhesion towards the surface coating after the surface coating has been exposed to high temperatures, such as temperatures in a range between 180° C. and 325° C., or in a range between about 180° C. and about 325° C., and high pressures, such as from between about 100 psi and about 400 psi, or from between about 100 psi and about 400 psi) for extended periods of time. Extended periods of time may lie in the range between 10 minutes and 2 hours, or in a range between about 10 minutes and about 2 hours.

In one embodiment, the surface coating is thermally stable after the surface coating has been exposed to a temperature of about 290° C. at a pressure of about 350 psi for about 30 minutes. The surface coating can be bonded to a stainless steel aperture brace at high temperature and high pressure without any degradation. Therefore the resulting printhead can prevent ink contamination because ink droplets can roll off the printhead front face, leaving behind no residue.

In some embodiments, a printing apparatus includes an inkjet printhead having a front face and an oleophobic anti-wetting coating disposed on a surface of the front face. The oleophobic anti-wetting coating includes an oleophobic low adhesion polymeric material configured such that jetted drops of ultra-violet gel ink or jetted drops of solid ink exhibit a contact angle greater than or about 40°, or greater than or about 45°. In one embodiment, jetted drops of ultra-violet gel ink or jetted drops of solid ink exhibit a contact angle greater than or about 55°. In another embodiment, jetted drops of ultra-violet gel ink or jetted drops of solid ink exhibit a contact angle greater than or about 65°. In one embodiment, there is no upper limit to the contact angle exhibited between the jetted drops of ultra-violet gel ink or jetted drops of solid ink and the surface coating. In another embodiment, the jetted drops of ultra-violet gel ink or jetted drops of solid ink exhibit a contact angle less than or about 150°. In yet another embodiment, the jetted drops of ultra-violet gel ink or jetted drops of solid ink exhibit a contact angle less than or about 90°.

When ink is filled into the printhead, it is desired to maintain the ink within the nozzle until it is time to eject the ink. Generally, the greater the ink contact angle, the better (meaning higher) the drool pressure. Drool pressure relates to the ability of the aperture plate to avoid ink weeping out of the nozzle opening when the pressure of the ink tank or the reservoir increases. Maintaining a higher pressure without weeping is necessary for printhead maintenance and also allows for faster printing when a print command is given.

In some embodiments, the coatings are thermally stable and are able to maintain the desire contact angle and sliding angle as disclosed herein, even after exposure to high temperatures, such as temperatures in a range between 180° C. and 325° C., or in a range between about 250° C. and about 300° C., and high pressures, such as pressures in a range between 100 psi and 400 psi, or in a range between about 200 psi and about 350 psi, for extended periods of time, between 10 minutes and 2 hours, or in a range between about 30 min and about 60 min. This maintains high drool pressures.

In one embodiment, the coatings are thermally stable and are able to maintain the desire contact angle and sliding angle as disclosed herein, even after exposure to a temperature of about 290° C. at pressures of about 300 psi for about 30 minutes, allowing maintenance of high drool pressures. Advantageously, the oleophobic anti-wetting coatings described herein provide, in combination, low adhesion and high contact angle for ultra-violet curable gel ink and solid ink, which further provides the benefit of improved drool pressure or reduced or eliminated weeping of ink out of the nozzle.

In one embodiment, the coatings of the present disclosure is able to maintain the contact angle and sliding angle with a drop of UV gel ink or a drop of solid ink of greater than about 40° with the surface of the coating after the coating has been exposed to a temperature of up to 290° C. for at least 30 minutes.

In one embodiment, the coatings of the present disclosure is able to maintain the contact angle and sliding angle with a drop of UV gel ink or a drop of solid ink of greater than about 40° and a sliding angle of less than about 30° with a surface of the coating.

In one embodiment, the coatings of the present disclosure is able to maintain the contact angle and sliding angle with a drop of UV gel ink or a drop of solid ink of greater than about 55° and a sliding angle of less than about 20° with a surface of the coating.

In one embodiment, the coating of the present disclosure is able to maintain the contact angle and sliding angle with a drop of UV gel ink or a drop of solid ink after the coating has been soaked in molten UV gel ink or solid ink at a temperature of at least 140° C. for a period of at least two days.

In embodiments, the crosslinked dimethyl methyltrifluoropropyl siloxane polymer comprises repeating units having Formula I, Formula I
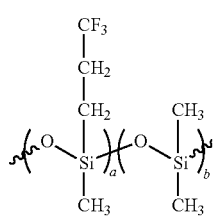

wherein a is an integer between 10 and 10,000; and b is an integer between 1 and 1,000. In further embodiments, a is an integer between 10 and 5,000, or an integer between 10 and 1,000. In further embodiments, b is an integer between 1 and 500.

In embodiments, the oleophobic anti-wetting coating comprises a crosslinked fluorosilicone polymer made by hydrosilylation reaction between a vinyl terminated dimethyl methyltrifluoropropyl siloxane polymer and a methylhydrogen methyltrifluoropropyl siloxane polymer cross-linker.

In embodiments, the crosslinked fluorosilicone polymer is present in an amount of from about 10 to about 100 percent, from about 20 to about 70 percent, or from about 95 to about 100, by weight of the total weight of the cured coating.

In embodiments, the vinyl terminated dimethyl methyltrifluoropropyl silioxane polymer has the general formula

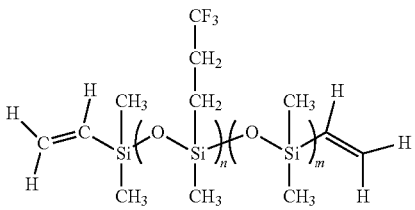

wherein m and n are integers from about 1 to about 300, from about 10 to about 200, or from about 30 to about 100; One specific example of the vinyl terminated fluorosilicone is CF3510 available from Nusil Technology LLC.

In embodiments, the methylhydrogen methyltrifluoropropyl siloxane polymer cross-linker has the general formula

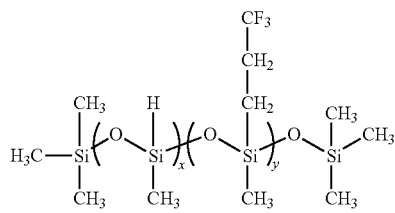

wherein m and n are integers from about 1 to about 100, from about 1 to about 30, or from about 30 to about 90. One specific example of the hydrogen siloxane cross-linker is XL 150 available from Nusil Technology LLC.

In embodiments, the crosslinked fluorosilicone polymer is formed from a hydrosilylation reaction of a polymer containing vinyl groups and a crosslinking agent containing Si—H groups.

Figure 3:
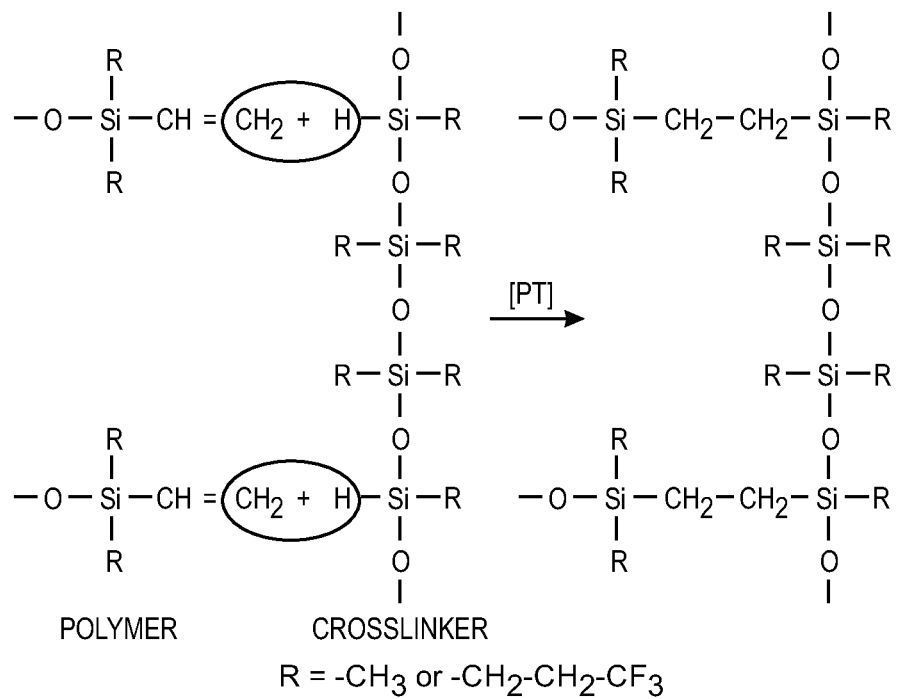
FIG. 3 is a schematic of a crosslinked fluorosilicone polymer produced by a hydrosilyation reaction according to the present embodiments.

In some embodiments, the oleophobic anti-wetting coating is based on platinum-catalyzed addition curing of two components, namely, vinyl terminated dimethyl methyltrifluoropropyl silioxane polymer and methylhydrogen methyltrifluoropropyl siloxane polymer cross-linker, via a hydrosilyation reaction, as shown in FIG. 3.

In embodiments, the vinyl terminated dimethyl methyltrifluoropropyl siloxane polymer and the methylhydrogen methyltrifluoropropyl siloxane polymer cross-linker, and the platinum catalyst are can be mixed together for a time of from about 1 minute to about 30 minutes, from about 30 minutes to about 180 minutes or from 180 minutes to about 5 hours.

Generally, the weight ratio of the vinyl terminated dimethyl methyltrifluoropropyl silioxane polymer to the methylhydrogen methyltrifluoropropyl siloxane polymer cross-linker is from about 100:1 to about 1:1, from about 70:1 to about 10:1, or from about 20:1 to about 5:1.

A platinum catalyst may be added to the reaction mixture to increase the rate of the hydrosilyation reaction. Examples of the platinum catalyst include, but are not limited to, chloroplatinic acid and its derivatives e.g., Speier's catalyst, Karstedt catalyst, platinum chloride-olefin complexes, platinum cyclomethylvinylsiloxane, [PtCl2(cyclooctadiene)], and the like. In embodiments, the catalyst is present in the hydrosilyation reaction in an amount of from about 0.01 ppm to about 1 ppm, or of from about 1 ppm to about 100 ppm, or of from about 100 ppm to about 1000 ppm.

In embodiments, the vinyl terminated dimethyl methyltrifluoropropyl silioxane polymer or the methylhydrogen methyltrifluoropropyl siloxane polymer cross-linker can be diluted by a solvent, such as, trifluorotoluene, perfluoroalkanes, perfluorofluoroketones, perfluoroalcohols, fluorinated tetrahydrofuran, fluorinated ethers, Novec 7200 (3M Chemical Company), Novec 7500(3M Chemical Company), Novec 7600 (3M Chemical Company), FC-75 (3M Chemical Company), Asahikilin AK-225 (SPI Supplies), chloroform, methylene chloride, methyl ethyl ketone, ethyl acetate, ethers, butyl acetate, acetone, and mixtures thereof. In embodiments the solvent can be present from about 1 to about 95 percent, or from about 10 to about 70 percent, or from about 75 to about 95 percent by weight.

In embodiments, the coating maintains a drool pressure of from about 1.5 to about 8 inches of water, or of from about 2 to about 8 inches of water, or of from about 2 to about 6 inches of water.

When coated onto the front face of an inkjet printhead, the oleophobic anti-wetting surface coating exhibits a sufficiently low adhesion with respect to the inks that are ejected from the inkjet printhead such that ink droplets remaining on the oleophobic anti-wetting coating can slide off the printhead in a simple, self-cleaning manner. Contaminants such as dust, paper particles, etc., which are sometimes found on the front face of inkjet printheads, can be carried away from the inkjet printhead front face by a sliding ink droplet. The oleophobic anti-wetting printhead front face coating can provide a self-cleaning, contamination-free inkjet printhead.

As used herein, the oleophobic anti-wetting coating can exhibit a "sufficiently low wettability" with respect to inks that are ejected from an inkjet printhead when a contact angle between an ink and the oleophobic anti-wetting coating is, in one embodiment, greater than about 45° and in another embodiment greater than about 55°.

The oleophobic anti-wetting coating disclosed herein can be employed as an oleophobic low adhesion printhead front face coating for an inkjet printhead of any suitable inkjet printer, such as continuous inkjet printers, thermal drop-on-demand (DOD) inkjet printers, and piezoelectric DOD inkjet printers. As used here, the term "printer" encompasses any apparatus, such as a digital copier, bookmaking machine, facsimile machine, multi-function machine, and the like, which performs a print outputting function for any purpose.

The oleophobic anti-wetting coating disclosed herein can be employed as an oleophobic low adhesion printhead front face coating for an inkjet printhead configured to eject any suitable ink such as, aqueous inks, solvent inks, UV-curable inks, dye sublimation inks, solid inks, etc. An exemplary inkjet printhead suitable for use with the oleophobic anti-wetting coating disclosed herein is described with respect to FIG. 2.

Figure 2:
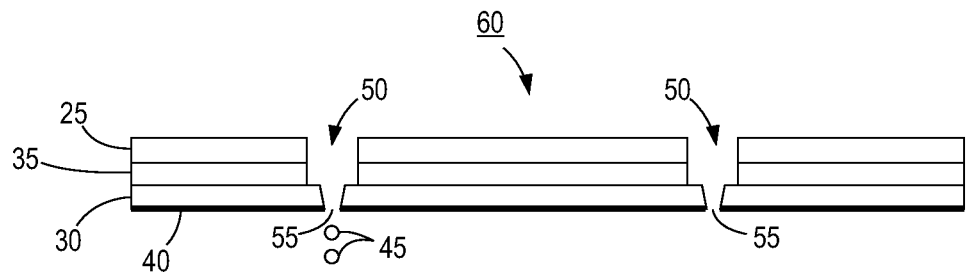
FIG. 2 is a cross-sectional view of an inkjet printhead according to the present embodiments.

A typical inkjet printhead 60 may include a nozzle plate 30 typically bonded to a support brace 25. FIG. 2 shows an embodiment of a printhead jet stack having an anti-wetting coating 40. In this embodiment, an oleophobic, anti-wetting coating 40 is bonded to a nozzle plate 30. The nozzle plate may be a polymer film, such as a polyimide film, bonded to an aperture support brace 25.

The support brace 25 is formed of any suitable material such as stainless steel and include apertures 50 defined therein. The apertures 50 may communicate with an ink source (not shown). The nozzle plate 30 may be formed of any suitable material such as polyimide and include nozzles 55 defined therein. The nozzles 55 may communicate with the ink source via the apertures 50 such that ink 45 from the ink source is jettable from the printhead 60 onto a recording substrate through a nozzle 50.

In the illustrated embodiment, the nozzle plate 30 is bonded to the support brace 25 by an intervening adhesive material 35. The adhesive material 35 may be provided as a thermoplastic adhesive can be melted during a bonding process to bond the nozzle plate 30 to the support brace 25. Typically, the nozzle plate 30 and the oleophobic anti-wetting coating 40 are also heated during the bonding process. Depending on the material from which the thermoplastic adhesive is formed, bonding temperature can be in a range between 180° C. and 325° C.

Conventional oleophobic anti-wetting coatings tend to degrade when exposed to temperatures encountered during typical bonding processes or other high-temperature, high pressure processes encountered during fabrication of inkjet printheads. However, the oleophobic anti-wetting coating 40 disclosed herein exhibits a sufficiently low adhesion (indicated by low sliding angles) and high contact angle with respect to an ink after it has been heated to the bonding temperature. The oleophobic anti-wetting coating 40 can provide a self-cleaning, contamination-free inkjet printhead 60 with high drool pressure. The ability of the oleophobic anti-wetting coating 40 to resist substantial degradation in desirable surface properties (e.g., including low sliding angle and high contact angle) upon exposure to elevated temperatures enables inkjet printheads having self-cleaning abilities while maintaining high drool pressure, to be fabricated using high-temperature and high pressure processes.

In one embodiment, the oleophobic anti-wetting coating may be formed on the substrate by initially applying the reactant mixture that, as described above, includes at least a polymer containing vinyl groups and crosslinking agent containing Si—H groups. After the reactant mixture is applied to the substrate, the reactants are reacted together to form the oleophobic anti-wetting coating. The reactants can be reacted together by, for example, curing the reactant mixture. In one embodiment, the reactant mixture is first cured at a temperature of about 160° C. for about 60 minutes to 4 hours. In another embodiment, the reaction mixture is cured at room temperature for 24 hours.

In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform or substantially uniform amount of the reactant mixture. The use of a doctor blade is another technique that can be employed to apply the reactant mixture. In flow coating, a programmable dispenser is used to apply the reactant mixture.

The inks described herein are further illustrated in the following examples. All parts and percentages are by weight unless otherwise indicated.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Coating 1

For the evaluation of oleophobic anti-wetting coatings on potential inkjet printhead front face substrates, coatings were prepared as follows. In a representative reaction 3.63 g of CF3510 available from Nusil Technology-vinyl terminated dimethyl methyltrifluoropropyl silioxane polymer and 0.41 g of XL 150 available from Nusil Technology-methylhydrogen methyltrifluoropropyl siloxane polymer cross-linker) were measured into a round bottom flask. Then 29 g of ethyl acetate solvent was added to the flask and the contents were stirred under $N_2$ at 61° C. for 24 hours. The resulting formulation was coated on polyimide substrate using a 0.005 mil drawbar coater. The wet films were cured at 160° C. for 4 hours to yield uniform defect free anti-wetting coating.

Evaluations

Figure 4:
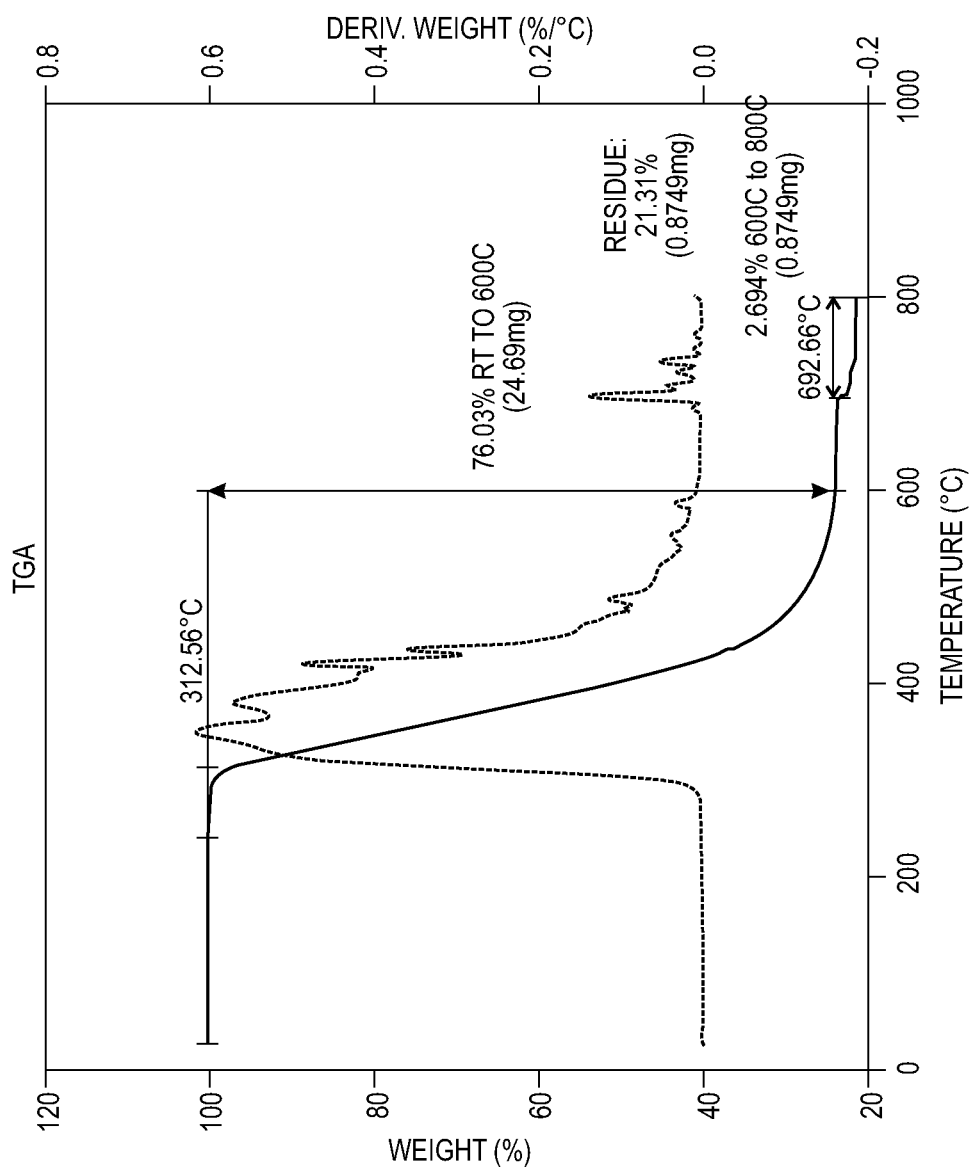
FIG. 4 is a graph illustrating the thermal stability of a thermally stable oleophobic anti-wetting coating for the inkjet printhead according to the present embodiments.

A TGA decomposition profile in air also confirms the extremely high thermal stability of these coatings, as shown in FIG. 4. In a typical Thermogravimetric Analysis (TGA) experiment, pieces of coating were heated in a furnace and weight loss due to decomposition was plotted against temperature. A lower weight loss % indicates higher thermally stable coating. The coatings showed only 1% weight loss up to 316° C., indicating high thermal stability in conditions that would be encountered during printhead fabrication. In another example, the coating was kept in an over at 300° C. for 60 minutes. The coating lost only 3% of it's weight after 300° C./60 minutes indicating high thermal stability. Thermal robustness of coating is necessary as it is exposed to a temperature of from about 200° C. to about 315° C. for about 15 minutes to about 120 minutes during printhead fabrication process. In summary, the coating of the present embodiments loses less than 15% of the total weight of the coating after heating to 300° C. and for 60 minutes.

Coatings were evaluated for surface property towards solid ink. Results are given in Table 1 below. These coatings maintained high contact angle after stacking conditions (290° C./350 psi with Teflon coverlay) which simulate press adhesive bonding cycles of printhead fabrication. Also stacked coatings maintained high contact angle after two days/140° C./CYMK ink soak aging. The coatings displayed low sliding angle indicating low ink adhesion. Sliding angle of below 30 degree typically indicate that ink has low adhesion to be cleaned from surface without leaving a residue. Additionally, when test coupons were pulled from ink soak studies, the ink came cleanly off and no ink residue was observed on the coatings. This suggests that ink may be wiped of cleanly by wiper blade during printhead maintenance cycles.

TABLE 1

| Coating | TGA weight loss % between 30-300° C. range (Onset of major decomposition) | Coating thickness and Mass loss after exposure to 290° C. for 30 min | Surface property CA (Sliding angle (°)) Towards solid ink | |
|---|---|---|---|---|
| | | | Stacking 290° C./350 psi/30 min | Stacking +2 day Inking at 140° C. |
| Coating 1 | 1% (316 C.) | ~3-5% | 61 (21) | 60 (25) |

Summary

The present embodiments provide novel compositions for the thermally stable, mechanically robust, oleophobic anti-wetting coatings and the procedures to prepare the coating. The present embodiments have been demonstrated to be especially well-suited for piezo printheads. The anti-wetting coating exhibits the desirable high ink contact angle and low sliding angle while having excellent thermal stability. These coating also show very little thickness and mass loss after 290° C. temperature exposure.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A coating for an ink jet printhead front face, wherein the coating comprises:
   a crosslinked dimethyl methyltrifluoropropyl siloxane polymer derived from a methylhydrogen methyltrifluoropropyl siloxane polymer cross-linker having the general formula

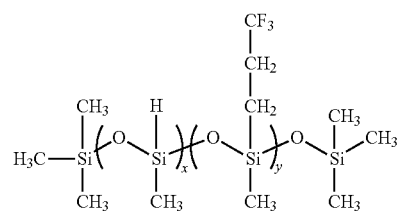

wherein each x and y is independently an integer from about 1 to about 100, wherein the coating has high thermal stability as indicated by less than about 15 percent weight loss when heated to up to a temperature of 290° C. at a pressure of up to 350 psi.

2. The coating of claim 1, wherein a drop of ultra-violet (UV) gel ink or a drop of solid ink exhibits a contact angle of greater than about 40°.

3. The coating of claim 1, wherein the coating has a sliding angle of less than about 30°.

4. The coating of claim 1, wherein the coating maintains the contact angle and sliding angle with the drop of ultraviolet (UV) gel ink or the drop of solid ink after the coating has been soaked in molten UV gel ink or solid ink at a temperature of at least 140° C. for a period of at least two days.

5. The coating of claim 1 wherein the coating loses less than 15% of the total weight of the coating after heating to 300° C. and for 60 minutes.

6. The coating of claim 1 maintaining a drool pressure of from about 1.5 to about 8 inches of water.

7. The coating of claim 1, wherein the crosslinked dimethyl methyltrifluoropropyl siloxane polymer is prepared a reaction between a vinyl terminated dimethyl methyltrifluoropropyl silioxane polymer and a methylhydrogen methyltrifluoropropyl siloxane polymer cross-linker in presence of a platinum catalyst.

8. The coating of claim 1, wherein the crosslinked fluorosilicone polymer is present in an amount of from about 10 to about 100 percent by weight of the total weight of the cured coating.

9. The coating of claim 1, wherein the crosslinked fluorosilicone polymer is formed from a hydrosilylation reaction of a polymer containing vinyl groups and a crosslinking agent containing Si—H groups.

10. The coating of claim 9, wherein the drop of UV gel ink or the drop of solid ink exhibits a contact angle of greater than about 40° and a sliding angle of less than about 30° with a surface of the coating.

11. The coating of claim 9 maintaining a drool pressure of from about 1.5 to about 8 inches of water.

12. A process of forming an oleophobic anti-wetting coating for an ink jet printhead front face, comprising:

coating a reactant mixture comprising a polymer containing vinyl groups and a crosslinking agent containing Si—H groups onto a substrate;

subjecting the coated reactant mixture to a curing treatment at a first temperature, wherein the polymer is a vinyl terminated dimethyl methyltrifluoropropyl silioxane polymer having the structure

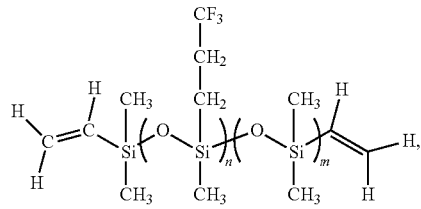

wherein n is between 30 and 100 and m is between 1 and 10.

13. The process of claim 12, wherein the crosslinking agent is methylhydrogen methyltrifluoropropyl siloxane polymer cross-linker having the structure

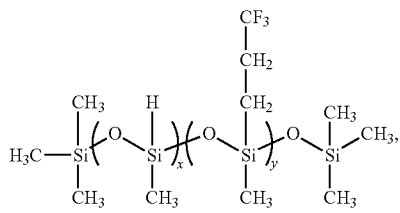

wherein x is between 1 and 5 and y is between 1 and 10.

14. The process of claim 12, wherein the polymer containing vinyl groups and a crosslinking agent containing Si—H groups are reacted in a weight ratio of from about 20:1 to about 5:1.

* * * * *